United States Patent
Shim

(12) 
(10) Patent No.: US 6,727,299 B1
(45) Date of Patent: Apr. 27, 2004

(54) AROMATIC POLYSULFIDE AND AN ASPHALT COMPOSITION CONTAINING THE SAME

(75) Inventor: Kyung-Sup Shim, Incheon-metropolitan (KR)

(73) Assignee: Markpro Company, Limited (KR)

( * ) Notice: Subject to any disclaimer, the term of this patent is extended or adjusted under 35 U.S.C. 154(b) by 14 days.

(21) Appl. No.: 10/088,186

(22) PCT Filed: Sep. 15, 2000

(86) PCT No.: PCT/KR00/01039

§ 371 (c)(1),
(2), (4) Date: Jul. 25, 2002

(87) PCT Pub. No.: WO01/19724

PCT Pub. Date: Mar. 22, 2001

(30) Foreign Application Priority Data

Sep. 15, 1999 (KR) .......................... 1999/39522

(51) Int. Cl.$^7$ .............................................. C08L 95/00
(52) U.S. Cl. ............................ 524/59; 524/68; 524/70; 524/71
(58) Field of Search ............................ 524/59, 68, 69, 524/70, 71

(56) References Cited

U.S. PATENT DOCUMENTS

| | | | | |
|---|---|---|---|---|
| 3,697,601 A | * | 10/1972 | Fujisawa et al. ............... | 568/49 |
| 3,843,614 A | * | 10/1974 | Doorakian ................... | 528/388 |
| 3,986,981 A | * | 10/1976 | Lyons ......................... | 252/404 |
| 4,082,808 A | * | 4/1978 | Hay ............................ | 568/48 |
| 4,097,534 A | * | 6/1978 | Hirsch ......................... | 568/48 |
| 4,170,702 A | * | 10/1979 | Hirsch ......................... | 528/219 |
| 4,247,336 A | * | 1/1981 | Simic ..................... | 106/287.23 |
| 4,740,578 A | * | 4/1988 | Onoe et al. ................... | 566/62 |
| 6,180,697 B1 | * | 1/2001 | Kelly et al. ................... | 524/59 |
| 6,310,122 B1 | * | 10/2001 | Butler et al. .................. | 524/60 |
| 6,407,152 B1 | * | 6/2002 | Butler et al. .................. | 524/59 |
| 6,441,065 B1 | * | 8/2002 | Chevillard et al. ............ | 524/71 |
| 6,569,351 B1 | * | 5/2003 | Baumgardner et al. | 252/182.17 |
| 6,569,925 B2 | * | 5/2003 | Menapace et al. ............ | 524/68 |
| 6,588,974 B2 | * | 7/2003 | Hildebrand et al. .......... | 404/31 |

FOREIGN PATENT DOCUMENTS

| | | | |
|---|---|---|---|
| DE | 2016568 | | 10/1970 |
| GB | 1121305 | | 7/1968 |
| GB | 1303318 | * | 1/1973 |
| JP | 10 081680 | | 3/1998 |

OTHER PUBLICATIONS

International Search Report—PCT/KR00/01039, Austrian Patent Office, Dec. 12, 2000.

* cited by examiner

*Primary Examiner*—Joseph D. Anthony
(74) *Attorney, Agent, or Firm*—Harness, Dickey & Pierce, P.L.C.

(57) ABSTRACT

The present invention relates to a novel aromatic polysulfide and an asphalt composition containing the same, and more particularly, to a novel aromatic polysufide having repeating units of the following formula (I), an asphalt composition, an asphalt paving composition, an adhesion promoter and an UV absorber containing the same:

(I)

$$\left( \begin{array}{c} OH \\ \phantom{x} \\ R_3 \phantom{xx} R_2 \\ R_1 \end{array} S_x \right)_n$$

The asphalt paving composition of this invention exhibits excellent adhesiveness to aggregate component and better water resistance, and renders the temperature susceptibility less sensitive, thereby greatly improving durability.

5 Claims, 1 Drawing Sheet

AROMATIC POLYSULFIDE AND AN ASPHALT COMPOSITION CONTAINING THE SAME

BACKGROUND OF THE INVENTION

1. Field of the Invention

The present invention relates to a novel aromatic polysulfide and an asphalt composition containing the same. More particularly, this invention relates to a novel aromatic polysufide and an asphalt composition, an adhesive promoter and an ultraviolet absorber containing the same.

2. Description of the Related Art

Korean Patent Application No. 1993-14434 discloses a modified asphalt composition comprising 0.3–100 wt % of polyolefin-type metal complex based on the 100 wt % of asphalt in order to improve physical properties of prior asphalt composition.

Korean Patent Application No, 1996-81058 reports a novel asphalt modifier with lower viscosity and odor-free character and an asphalt composition containing the above asphalt modifier, prepared in such a manner that naphtenic acid containing sulfur compound and other impurities is separated by distillation at the temperature of 70–200° C. and then remaining volatile portions are removed by passing inert gas, after which oils such as lubricating oil are added to the treated compound. Korean Patent Application No. 1992-8279 also sets forth a cold-mixed asphalt paving composition containing straight asphalt, gas oil and polymeric hardening agent.

Meanwhile, U.S. Pat. Nos. 4,244,747, 4,234,346 and 4,801,332 disclose an improved asphalt composition further comprising organic metal compound such as organic manganese compound, organic cobalt compound. Furthermore, U.S. Pat. No. 4,008,095 describes an asphalt paving composition comprising microgranular undigested coal particles, bituminous coal and asphalt.

An asphalt composition comprising polyolefins modified with a carboxyl group and/or other functional group derived from the carboxyl group is described in Japanese Patent Kokai Nos. Sho 54-139925, Sho 59-138263, Sho 60-158256, Sho 62-181358 and Sho 62-275160.

U.S. Pat. No. 5,710,196 provides an asphalt composition comprising a graft copolymer, for example, acrylonitrile-butadiene-styrene copolymer resin so as to enhance the properties of asphalt composition. Furthermore, in order to reduce the cracking of asphalt, especially at low temperatures due to heavy loads, U.S. Pat. Nos. 4,547,399, 4,835, 199 and 5,002,987 suggest compositions of elastomeric copolymers and asphalt.

However, the conventional asphalt compositions including the aforementioned compositions fail to meet the requirement for excellent asphalt, for example, adhesiveness, water resistance, cracking-durability and abrasion resistance.

In the meantime, copolymer of metacrylic ester mono and vinyl monomer, which has the chromophore group representing different ultraviolet (hereinafter referred to as "UV") absorption patterns from the metacrylic ester mono is provided as an UV absorber in Korean Patent Application No. 1988-700951. In addition, Korean Patent Application No. 1995-3408 discloses a novel bezazol compound designed for the UV absorber, prepared in such a manner that carboxylic derivatives and o-phenyldiamine are reacted at the temperatures ranging, between 20° C.–90° C. in the presence of chloro sulfonic acid.

In an effort to reduce the detrimental effect of UV by absorbing UV, Korean Patent Application No. 1989-18583 provides conjugated bis-1,3-diketone derivatives of benzene and Korean Patent Application No. 1989-19891 provides a composition comprising oligomer of cyclohexenilidene cyanoacetate.

SUMMARY OF THE INVENTION

To solve the long-felt need in the art, the inventor has made intensive studies and as a result, developed a novel aromatic polysulfide polymer, noting that the aromatic polysulfide polymer may improve various properties of asphalt composition and serve as excellent an UV absorber.

Accordingly, an object of this invention is to provide a novel aromatic polysulfide polymer and a method for preparing the same.

Another object of this invention is to provide an asphalt composition comprising the above polysulfide.

Still another object of this invention is to provide an adhesion promoter applied to polymer resin and an UV absorber.

Other objects and advantages of this invention will become more apparent from the detailed description to follow taken in conjunction with the appended claims.

DETAILED DESCRIPTION OF THE INVENTION

Figure 1:
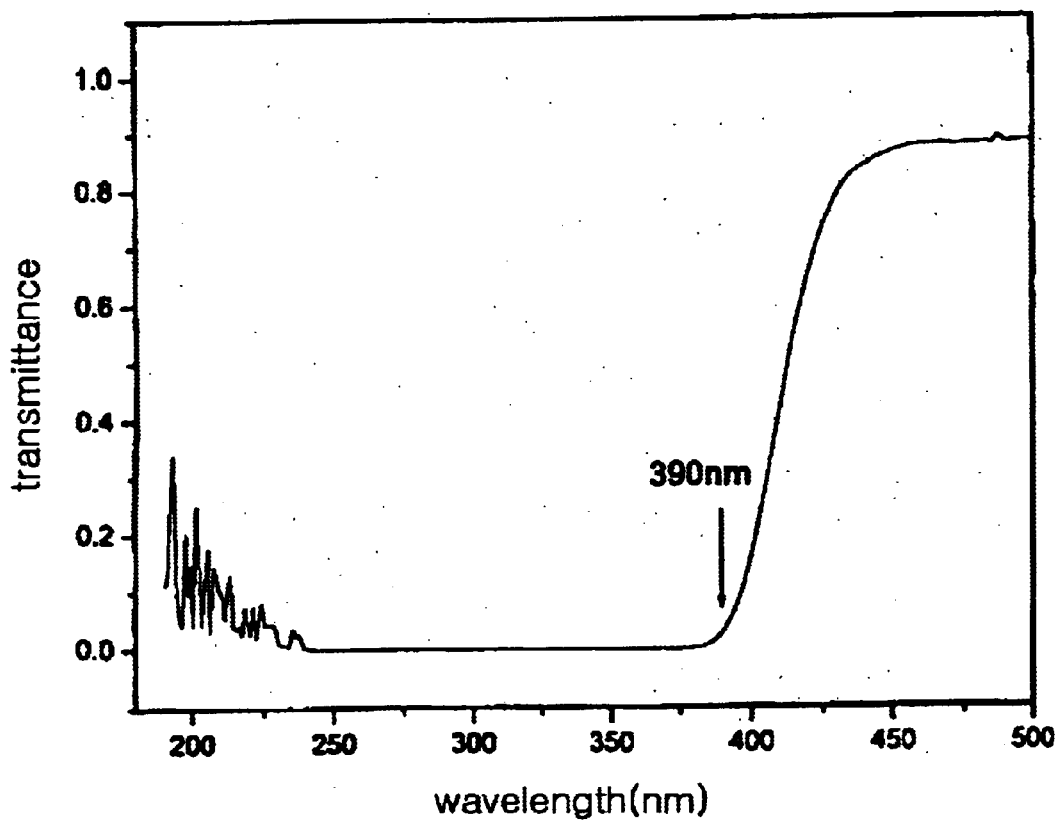
FIG. 1 is a graph representing the UV transmission pattern of the present polysulfide.

This invention relates to a novel aromatic polysulfide having repeating units of the following formula (I):

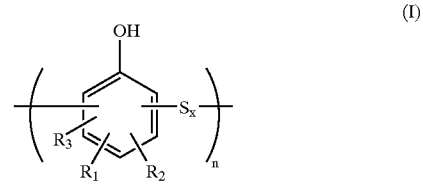

(I)

wherein $R^1$, $R_2$ and $R_3$ are the same or different from each other, and independently represent H, unsubstituted alkyl group, substituted alkyl group, unsubstituted aryl group or substituted aryl group; x is an integer of 1–4; and n is an integer of 2–10,000.

The structural feature of the present aromatic polysulfide is that elements in the 6B group, oxygen and sulfur, which have two electron lone pairs, are bonded to benzene nucleus. The electron lone pairs of oxygen and sulfur can simultaneously interact with cations, which may be components of asphalt paving composition, through electrostatic interaction, thereby improving a variety of physical properties of an asphalt paving composition.

The benzene ring of the polysulfide provides an ability to serve as excellent an UV absorber.

The average molecular weight of the present polysulfide may vary depending on polymerization, but preferably in the range of 5,000 to 20,000, and more preferably in the range of 7,000 to 15,000. If the molecular weight of the polysulfide is less than 5,000, an asphalt composition and an asphalt paving composition containing such polymer may be worse in view of durability, though inducing better processability.

If the molecular weight is more than 20,000, the processability may be decreased, though temperature susceptibility and durability are increased.

The substituents in the aromatic polysulfide of this invention may be any substituents, but preferably including unsubstituted alkyl group, substituted alkyl group, unsubstituted aryl group or substituted aryl group.

As used herein, "alklyl" means a branched or unbranched saturated hydrocarbon chain, which can be unsubstituted or substituted. For example, $C_1$–$C_6$ straight or branched alkyl hydrocarbon chain contains 1 to 6 carbon atoms, and includes but is not limited to substituents such as methyl, ethyl, propyl, iso-propyl, butyl, iso-butyl, tert-butyl, n-pentyl, n-hexyl, and the like, unless otherwise indicated. The substituted alkyl has substituent(s) at one or more positions selected from halo, nitro, hydroxyl, al, alkeyl, alkoxy, alkenyloxy, phenoxy, benzyloxy or aryl.

The term "aryl", alone or in combination, is defined herein as a monocyclic or polycyclic group, preferably a monocyclic or bicyclic group, i.e. phenyl or naphthyl, which can be unsubstituted or substituted, for example, with one or more and, in particular, one to three substituents selected from halogen, alkyl, hydroxy, alkoxy, haloalkyl, nitro, amino, acylamnino, alkylthio, alkylsulfinyl and alkylsulfonyl. Some exemplary aryl groups include phenyl, 2-chlorophenyl, 3-chlorophenyl, 4-chlorophenyl, 2-methylphenyl, 4-methoxyphenyl, 3-trifruoromethylphenyl, 4-mitrophenyl, and the like.

This invention also relates to a method for preparing a novel aromatic polysulfide represented by the following scheme (I), comprising the step of reaction between phenol analogue and sulfur chloride species:

Scheme (I)

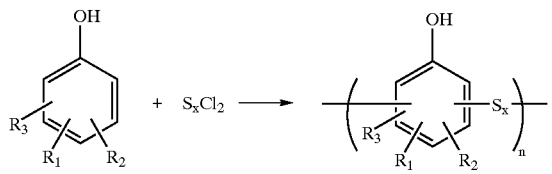

wherein $R_1$, $R_2$ and $R_3$ are the same or different from each other, and independently represent H, unsubstituted alkyl group, substituted alkyl group, unsubstituted aryl group or substituted aryl group; x is an integer of 1–4; and n is an integer of 2–10,000.

As explained above, the method of the present invention is performed by the reaction of phenol or phenol derivatives and sulfur chloride species, which may be classified as condensation polymerization, and the reaction condition is mild. For instance, the preferred reaction temperature is in the range of 50° C.–90° C.

In addition, it is preferred that the method of this invention further comprises the step of adding an alkyl halide or aryl halide so as to add various substituents into the benzene nucleus. According to the method of this invention, the sulfur chloride species used is selected from the group consisting of sulfur dichloride, sulfur monochloride, trisulfur dichloride and tetrasulfur dichloride, and the most preferred sulfur chloride species is sulfur monochloride.

This invention provides an asphalt composition comprising: (i) a novel aromatic polysulfide having repeating units of the following formula (I)

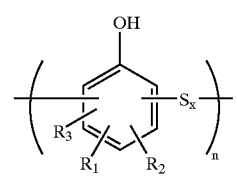

wherein $R_1$, $R_2$ and $R_3$ are the same or different from each other, and independently represent H, unsubstituted alkyl group, substituted alkyl group, unsubstituted aryl group or substituted aryl group; x is an integer of 1–4; and n is an integer of 2–10,000; and (ii) an asphalt.

The aromatic polysulfide contained in the asphalt composition is responsible for improving various properties such as penetration, ductility, and temperature susceptibility. According to the preferred example, the amount of the polysulfide compound is from 0.5 to 10 wt % and the amount of the asphalt is from 90 to 99.5 wt % based on the weight of the composition. If the amount of the polysulfide is less than 0.5 wt %, the effect of adding polysulfide may be negligible, but in case of exceeding 10 wt %, cracking is caused by hardening of the composition. Furthermore, if the amount of asphalt composition is less than 90 wt %, the fluidity may be decreased, but in excess of 99.5 wt %, the durability may be dramatically decreased though strength is increased.

This invention also relates to an asphalt paving composition comprising an asphalt composition aforementioned (comprising 0.5 to 10 wt % of polysulfide having repeating units of formula (I) and 90 to 99.5 wt % of asphalt), aggregate, stone powder and sand. According to the preferred example, the asphalt paving composition comprises 4 to 10 wt % of the asphalt composition, 65 to 85 wt % of the aggregate, 3 to 10 wt % of the stone powder and 8 to 25 wt % of the sand.

According to this invention, an useful asphalt can be any conventional asphalt in the art, and preferably includes straight asphalt, blown asphalt, lake asphalt, rock asphalt, sand asphalt, asphaltite, etc., and the most preferably includes straight asphalt.

In the asphalt paving composition of this invention, if the amount of the asphalt composition is less than 4 wt %, the physical strength and the fluidity may be remarkably decreased, but in case of exceeding 10 wt %, the durability may be decreased.

The asphalt paving composition exhibits excellent adhesiveness to aggregate component and better water resistance, and renders the temperature susceptibility less sensitive, thereby greatly improving durability.

This invention also provides an adhesion promoter applied to polymer resin, which comprises a novel aromatic polysulfide having repeating units of the following formula (I):

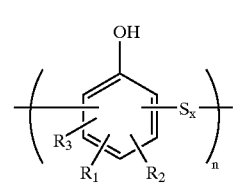

wherein $R_1$, $R_2$ and $R_3$ are the same or different from each other, and independently represent H, unsubstituted alkyl group, substituted alkyl group, unsubstituted aryl group or substituted aryl group; x is an integer of 1–4; and n is an integer of 2–10,000.

The aromatic polysulfide serving as an adhesion promoter renders polymer resin (for example, polyethylene, polypropylene, polyisobutylene, polyvinylchloride, polystyrene, polyvinylacetate, polyisoprene) containing the polysulfide to be more adhesive.

This intention provides an UV absorber comprising a novel aromatic polysulfide having repeating units of the following formula (I):

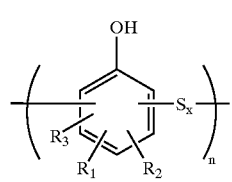

wherein $R_1$, $R_2$ and $R_3$ are the same or different from each other, and independently represent H, unsubstituted alkyl group, substituted alkyl group, unsubstituted aryl group or substituted aryl group; x is an integer of 1–4; and n is an integer of 2–10,000.

The aromatic polysulfide may function as an UV absorber in paint, plastic film, etc. to reduce sensitivity to UV, thereby extending the life span of such product.

The following specific examples are intended to be illustrative of the invention and should not be construed as limiting the scope of the invention as defined by the appended claims.

EXAMPLE 1

Preparation of the Aromatic Polysulfide of This Invention I

In a 5-necked flask of 5 liters fitted with 2-additional funnels, water cooled condenser, agitator and thermometer was placed para-cresol (2160 g: 20 mole) and heated to 70° C. To it was added sulfur monochloride (2835 g: 21 mole) dropwise while maintaining the reaction temperature at 50° C–70° C. When 70% of the sulfur monochloride was added, methylene chloride (1000 ml) was introduced. Then, the remaining sulfur monochloride was added, and heated for an additional hour at 70° C.–80° C.

Upon completion of the reaction, 2000 ml of water was added to remove any unreacted sulfur monochloride. Removal of solvent and water gave a dark yellowish solid polymer.

The resultant polymer shows about 8,000 of the average molecular weight and 80° C. of the melting point. The IR absorption spectrum of the polymer exhibits troughs at 3400 $cm^{-1}$, 1440 $cm^{-1}$, 1220 $cm^{-1}$ and 1160 $cm^{-1}$.

EXAMPLE 2

Preparation of the Aromatic Polysulfide of This Invention II

The aromatic polysulfide according to this invention was prepared in the same manner as in EXAMPLE 1, except that phenol was used instead of para-cresol.

The final product shows about 8,000 of the average molecular weight and 80° C. of the melting point.

EXAMPLE 3

Preparation of the Aromatic Polysulfide of This Invention III

The aromatic polysulfide according to this invention was prepared in the same manner as in EXAMPLE 1, except that meta-cresol was used instead of para-cresol.

The yielded product shows about 8,000 of the average molecular weight and 80° C. of the melting point.

EXAMPLE 4

Preparation of the Aromatic Polysulfide of This Invention IV

The aromatic polysulfide according to this invention was prepared in the same manner as in EXAMPLE 1, except that mixed cresol (including ortho-cresol, para-cresol and meta-cresol) was used instead of para-cresol.

The yielded product shows about 8,000 of the average molecular weight and 80° C. of the melting point.

EXAMPLE 5

Preparation of the Asphalt Composition of This Invention 1 wt %, 2 wt % and 3 wt % of aromatic polysulfide prepared in EXAMPLE 1 were respectively added to 99 wt %, 98 wt % and 97 wt % of straight asphalt, thereby making total weight percent of the final composition 100 wt %. Then while melting, each mixture was completely mixed to yield the asphalt composition it 150° C.

EXAMPLE 6

Preparation of the Asphalt Paving Composition of This Invention 6 wt % of each asphalt composition prepared in EXAMPLE 5, 34 wt % of aggregate having 19–13 mm of particle size, 40 wt % of aggregate having less than 13 mm of particle size, 15 wt % of sand and 5 wt % of stone powder were heated and mixed to yield the asphalt paving composition at 150° C.

EXPERIMENTAL EXAMPLE 1

Evaluation on Properties of the Asphalt Composition of This Invention

The various physical properties (including penetration, ductility, softening temperature and index of temperature susceptibility) of the asphalt composition prepared in EXAMPLE 5 were evaluated based on KS M 2252, KS M 2254 and KS M 2250, respectively. The results are summarized below Table 1:

EXPERIMENTAL EXAMPLE 2

Evaluation on Properties of the Asphalt Paving Composition of This Invention

The Marshall test on asphalt paving composition prepared in EXAMPLE 6 was carried out based on KS F 2337. And the Wheel tracking test on the asphalt paving composition prepared in EXAMPLE 6 was performed so as to evaluate resistance to rutting caused by wheels based on the Manual for Testing Qualities of Construction issued by the Korea Highway Corporation. The results are summarized below in Table 1:

TABLE 1

| Items | Physical Properties | Amount of aromatic polysulfide (wt %) | | |
|---|---|---|---|---|
| | | 1 | 2 | 3 |
| Asphalt Composition | Penetration (1/10 mm, 25° C.) | 85 | 82 | 79 |
| | Ductility (cm, 25° C.) | 150 | 150 | 150 |
| | Index of temperature susceptibility (° C.) | 0.0263 | 0.0178 | 0.0161 |
| | Softening temp.(° C.) | 59 | 67 | 72 |
| Asphalt Paving Composition | Marshall test Stability(kg) | 1.687 | 1.892 | 1.956 |
| | Fluidity(1/100 cm) | 30 | 28 | 27 |
| | Porosity(%) | 4.02 | 4.51 | 4.78 |
| | Wheel tracking Ratio of deformation (mm/min) | 0.035 | 0.014 | 0.009 |
| | Dynamic stability(times/mm) | 921 | 1237 | 1516 |

EXPERIMENTAL EXAMPLE 3

Evaluation on the Enhancing Adhesion of the Aromatic Polysulfide of This Invention In order to evaluate the adhesion enhancement of the polysulfide, 3 wt % of the polysulfide prepared in EXAMPLE 1 were added to the PVC solution in THF (tetrahydrofuran), the resultant was then coated on a stainless steel plate and finally dried. Following the lapse of proper time, the extent of adhesion was observed with the naked eyes. It was noted that the PVC solution containing the polysulfide of this invention adhered strongly to the stainless steel plate, thus not observing peeling off, but the PVC solution without the polysulfide was peeled off from the plate with a lapse of time.

As a result, it is confirmed that the polysulfide of this invention may remarkably enhance the adhesion of polymer resin.

EXPERIMENTAL EXAMPLE 4

Evaluation on the UV Transmittance of the Aromatic Polysulfide of This Invention In an effort to evaluate the UV transmittance of the polysufide prepared in EXAMPLE 1, 0.016 g of the polysulfide was dissolved in 8 ml of chloroform solution and then the UV transmittance was measured with UV-spectrophotometer (HP-8434). The transmittance was calculated in the following equation and the result was plotted as shown in FIG. 1:

Transmittance $(T)=10^{-A(\lambda)}$ wherein $A(\lambda)$ is absorbance. Equation (I)

As shown in FIG. 1, the polysulfide of this invention represents a much lower transmittance in the UV region and therefore has excellent property as an UV absorber.

What is claimed is:

1. An asphalt composition, which comprises
   (i) a novel aromatic polysulfide having repeating units of the following formula (I):

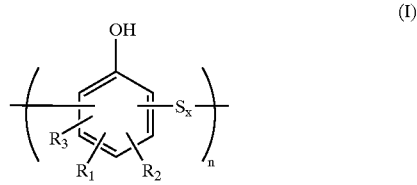

(I)

wherein $R_1$, $R_2$ and $R_3$ are the same or different from each other, and independently represent H, unsubstituted alkyl group, substituted alkyl group, unsubstituted aryl group or substituted aryl group; x is an integer of 1–4; and n is an integer of 2–10,000, and wherein the average molecular weight of the aromatic polysulfide is from 5.000 to 20,000; and
   (ii) an asphalt.

2. The asphalt composition according to claim 1, wherein the amount of the polysulfide compound is from 0.5 to 10 wt % and the amount of the asphalt is from 90 to 99.5 wt % based on the weight of the composition.

3. The asphalt composition according to claim 1 or 2, wherein the asphalt is selected from the group consisting of straight asphalt, blown asphalt, lake asphalt, rock asphalt, sand asphalt and asphaltite.

4. An asphalt paving composition comprising the asphalt composition of claim 1, aggregate, stone powder and sand.

5. The asphalt paving composition according to claim 4, wherein the amount of the asphalt composition is from 4 to 10 wt %, the amount of the aggregate is from 65 to 85 wt %, the amount of the stone powder is from 3 to 10 wt % and the amount of the sand is from 8 to 25 wt %.

* * * * *